United States Patent
Class et al.

(10) Patent No.: US 7,020,606 B1
(45) Date of Patent: Mar. 28, 2006

(54) VOICE RECOGNITION USING A GRAMMAR OR N-GRAM PROCEDURES

(75) Inventors: Fritz Class, Zainingen (DE); Ute Kilian, Ulm (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 09/581,408

(22) PCT Filed: Dec. 2, 1998

(86) PCT No.: PCT/DE98/03536

§ 371 (c)(1),
(2), (4) Date: Jun. 12, 2000

(87) PCT Pub. No.: WO99/30314

PCT Pub. Date: Jun. 17, 1999

(30) Foreign Application Priority Data

Dec. 11, 1997  (DE) .............................. 197 54 957

(51) Int. Cl.
*G01L 15/08* (2006.01)
*G01L 15/28* (2006.01)

(52) U.S. Cl. ...................... 704/242; 704/255
(58) Field of Classification Search ............. 704/231, 704/235, 255, 256, 242
See application file for complete search history.

(56) References Cited

U.S. PATENT DOCUMENTS

| | | | | |
|---|---|---|---|---|
| 5,005,203 A | * | 4/1991 | Ney | 704/255 |
| 5,732,394 A | * | 3/1998 | Nakadai et al. | 704/255 |
| 5,878,390 A | * | 3/1999 | Kawai et al. | 704/231 |
| 2002/0099543 A1 | * | 7/2002 | Eman et al. | 704/235 |

FOREIGN PATENT DOCUMENTS

| | | | |
|---|---|---|---|
| DE | 195 01 599 | | 5/1996 |
| JP | 01177600 A | * | 7/1989 |

OTHER PUBLICATIONS

Kita et al ("Incorporating LR Parsing Into SPHINX", International Conference on Acoustics, Speech & Signal Processing, Apr. 1991).*
Meteer et al ("Statistical Language Modeling Combining N-Gram And Context-Free Grammars", IEEE International Conference on Acoustics, Speech & Signal Processing, Apr. 1993).*
IBM (IBM Technical Disclosure Bulletin NN91067) speech recognition with HMM of speech waveforms for fixed-length segmen from given positions.*
Gauvain et al ("The LIMSI Continuous Speech Dictation System: Evaluation On The ARPA Wall Street Journal Task". IEEE International Conference on Acoustics, Speech, and Signal Processing, Apr. 1994).*

(Continued)

*Primary Examiner*—Angela Armstrong
(74) *Attorney, Agent, or Firm*—Kenyon & Kenyon LLP

(57) ABSTRACT

A method for voice recognition, wherein a diagram method with integrated unequivocal syntax restriction is combined with an N-gram voice model with statistical word sequence evaluation in such a way that alternative recognition methods can be used in different segments of a word sequence.

11 Claims, 2 Drawing Sheets

OTHER PUBLICATIONS

Costagliola et al ("Visual Language Editors Based On LR Parsing Techniques", © 2000) from 1989, combines LR-based techniques for parsing visual languages with the more general incremental Generalized LR parsing techniques developed for string languages.*

M. Meteer, et al., "Statistical Language Modeling Combining N-gram and Context-free Grammars", Speech Processing, Minneapolis, Apr. 27-30, 1993, pp. II-37-40. XP000427719 Institute of Electrical and Electronics Engineers.

S. Nakagawa, et al., "The Syntax-Oriented Speech Understanding System—SPOJUS-SYNO", Proceedings of the European Conference on Speech Communication and Technology (Eurospeech), Paris, Sep. 26-28, 1989, vol. 2, No. Conf. 1, Sep. 1, 1989, pp. 224-227, XP000209997.

K. Kita, et al., "Incorporating LR Parsing into Sphinx", Speech Processing I, Toronto, May 14-17, 1991, vol. 1, No. Conf. 16, May 14, 1991, pp. 269-272, XP000245219.

D. Jurafsky, et al., "Using a Stochastic Context-Free Grammar as a Language Model for Speech Recognition", Proceedings of the International Conference on Acoustics, Speech and Signal Processing (ICASSP), Detroit, May 9-12, 1995, pp. 189-192, XP000657962.

* cited by examiner

VOICE RECOGNITION USING A GRAMMAR OR N-GRAM PROCEDURES

FIELD OF THE INVENTION

The present invention relates to a method for recognizing speech from word sequences assembled from multiple words of a given vocabulary.

RELATED TECHNOLOGY

The error rate for recognition of continuously spoken speech that permits any desired combination of all words rises considerably by comparison with individual word recognition. To counteract this, knowledge about permissible word sequences is stored in so-called language models, and used during recognition in order to reduce the number of word sequences.

Language models are usually defined as so-called N-gram models, N designating the depth of the model; in other words, N successive words within a word sequence are taken into account during the current evaluation. Because the complexity of the recognition process rapidly rises with increasing values of N, digram (N=2) and trigram (N=3) language models are the ones principally used.

A German Patent No. 195 01 599 C1, which is hereby incorporated by reference herein, describes, in addition to various previously known methods for speech recognition, a method that allows the storage in a digram language model of phrases having fixed syntax and any desired length N. The method integrates knowledge about the syntax of permitted phrases (word sequences) into the language model, and is therefore also referred to as a "syntactic digram." An essential element for integrating syntax into the language model is the indexing of words that occur more than once in different phrase constellations. As a result, the speech recognition system is identical with and without integrated syntax.

With the severe limitation of the permissible word sequences and a limited number of permitted phrases, the speech recognition system operating according to the syntactic digram language model achieves a high recognition rate but is also usable only if syntactic limitations can be reliably defined and adhered to, for example in the case of short commands, date or time inputs, and the like. If the number of permitted word sequences is large, however, complete definition of the syntax is very laborious; and in situations where spontaneously formulated word sequences also need to be recognized, and in which there is no guarantee that syntactic limitations will be observed, recognition using a strictly syntactic language model is of only limited suitability.

A combination of linguistic detection models with phrase grammars and N-gram detection models in one language model is described in a publication of Meteer et al.: "Statistical Language Modeling Combining N-Gram and Context-Free Grammars," Speech Processing, Minneapolis, Apr. 27–30, 1993, Vol. 2, pp. II-37 to II-40, XP000427719, IEEE.

A publication of Kenji Kita: "Incorporating LR Parsing into Sphinx," ICASSP 91, Speech Processing 1, Toronto, May 14–18, 1991, Vol. 1, pp. 269–272, XP000245219, IEEE, describes a speech detection method that begins with a context-free grammar. If the parser can find a result with the context-free grammar, the digram grammar is not used. If a syntactically correct result is not present, a changeover is made to the digram grammar.

SUMMARY OF THE INVENTION

It is therefore a object of the present invention to describe a method for recognizing speech that offers an expanded area of application compared to existing methods, with a good recognition rate.

The present invention provides a method for recognizing speech from word sequences assembled from multiple words of a given vocabulary, in which a first recognition method and a second recognition method are provided. A first recognition method and a second recognition method are applied to separate segments of a word sequence that is to be recognized. A recognition method with integrated unique syntax is applied as the first method and a recognition method with statistical word sequence evaluation is applied as the second recognition method. Upon a change from the digram recognition method with integrated unique syntax to the second recognition method with statistical word sequence evaluation, the last two words of the segment processed using the first method are combined into one pseudoword that is processed using a digram detection method.

The combined utilization of two different recognition methods, in particular having different degrees of syntactic limitation, preferably of recognition methods based on a language model with unique syntax on the one hand, and of a statistical N-gram language model on the other hand, results, surprisingly, in a considerably expanded area of application, yielding a variety of possible combinations. According to the present invention successive word sequence segments of a cohesive word sequence are processed using different recognition methods. Depending on the area of application, a different division of the overall word sequence into segments, and use of the various recognition methods, may be advantageous. In this context here and hereinafter, what is meant as "words" is not only words in the linguistic sense as sound sequences having a demonstrable conceptual content; "words" are rather to be understood in general as sound sequences processed integrally in the speech recognition system, for example including the speaking of individual letters, syllables, or syllable sequences without a specific conceptual assignment.

When a word sequence is divided into one or more segments, it is possible in particular to predefine at least one segment in terms of position and/or length. A predefined segment of this kind can be positioned, in particular, at the beginning of a word sequence, and can also have a fixed length in terms of the number of words that it encompasses. Advantageously, the recognition method with the integrated unique syntax can then be allocated to this segment. Because of the limited length of the segment, the outlay in terms of syntax definition and processing using the recognition method with integrated unique syntax remains within acceptable limits. At the same time, the number of plausible word sequences can be considerably limited because the syntax is defined and is taken into account in the first segment. One advantageous field of application of this is the input of concepts by spelling. For example it is possible to recognize several tens of thousands of different city names by spelled-out speech input, with a surprisingly high recognition rate and little outlay, by combining an initial segment of fixed length that is processed on the basis of a recognition method with integrated unique syntax, and further processing of the speech input following that segment using a statistical N-gram recognition method, in particularly a digram or trigram recognition method. If exclusively a recognition method with integrated unique syntax were used, the outlay for syntax integration and process would greatly exceed tolerable limits. On the other, the exclusive use of a statistical language model in such cases would yield inadequate recognition rates.

Other advantageous examples of the segment-wise utilization of a recognition method with integrated unique syntax include word sequences with date or time information, whose word environment can then advantageously be processed with a statistical language model.

It is particularly advantageous if a statistical language model is combined with a language model with integrated syntax limitation even for the recognition of word sequences in which recurrent characteristic terms or phrases can be expected. In this context, the statistical recognition method is preferably used as the standard procedure; and if the word flow is monitored in a manner known per se for specific terms or phrases ("word spotting" or "phrase spotting"), it is possible, when such terms or phrases are detected, to initiate a segment in which speech recognition is performed using the detection method with integrated unique syntax. This segment can possess a fixed or variable length, which in particular can also be adapted to the respective term or phrase. After the completion of this segment, if the word sequence continues, it is then possible to change back to the standard recognition method with statistical word sequence evaluation.

For the recognition method with integrated unique syntax, it is preferable to use the syntactic digram recognition method known from the existing art cited initially. For the statistical speech recognition method with word sequence evaluation, a digram recognition method is then also advantageous for application of an integral speech recognition system. On the other hand, a statistical recognition method with a higher value of N yields an improved detection rate, but also requires greater processing outlay. An advantageous compromise is to use a trigram recognition method for the statistical recognition method; a preferred embodiment of the present invention provides for performing recognition with the information volume of a trigram recognition method in the form of digram processing.

BRIEF DESCRIPTION OF THE DRAWINGS

The present invention is illustrated in even further detail below with reference the drawings, in which.

DETAILED DESCRIPTION

Figure 1:
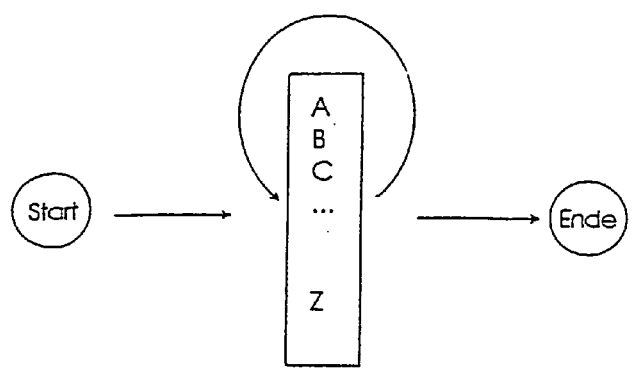
FIG. 1 shows a simple processing sequence diagram using the example of a spelled-out speech input.

The example selected for explanation of the present invention with reference to the drawing is spelled-out speech input of city names. The lexicon of a spelling recognition system to be used for this purpose comprises approximately 30 letters as well as a few additional words such as "double" or "dash." The list of city names contains, for example, several tens of thousands of entries, so that complete storage of the unique syntactic information (in this case the letter sequences) would increase the magnitude of the lexicon containing the syntactic information, and the computing time required for recognition, to unacceptable levels.

The sequence diagram sketched in FIG. 1 for the recognition of a spelled-out entry with no parameters of any kind indicates, by way of the arrows, that proceeding from a Start node, the word sequence (which, in the particular example selected, is a sequence of individually pronounced letter names) can begin with any one of the letters provided for, and any letter can be followed by any other letter unless the word sequence has already ended, as represented by the End node.

In the conventional network graph depiction, network paths are shown, for example, for the German city names Aachen, Aalen, and Amberg. As set forth in German Patent No. 195 01 599 C1 already cited as existing art, in a network graph of this kind the identical word nodes (letters) occurring at various positions of the network yield not only the plausible word sequences provided for by the network paths, but also in a plurality of nonsense word sequences that nevertheless qualify as permissible according to the language model.

To eliminate this problem, German Patent No. 195 01 599 C1 proposes to use indexing in order to distinguish those word nodes which occur more than once in the network. Indexing makes all the word nodes of the network unique, and for each word node it is possible to indicate completely, as the syntax describing the totality of all permissible word sequences, the permissible subsequent word nodes. Especially in the case of spelled-out input of terms from a long list of terms, the ambiguity of the network graph without indexing is enormous.

Figure 3:
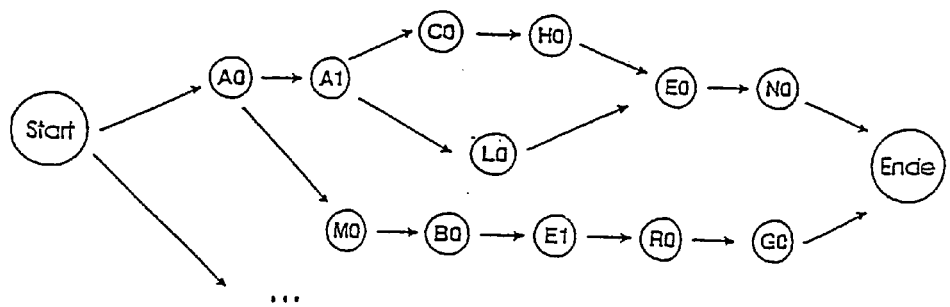
FIG. 3 shows the graph of FIG. 2 with additional syntactic limitation.
Figure 4:
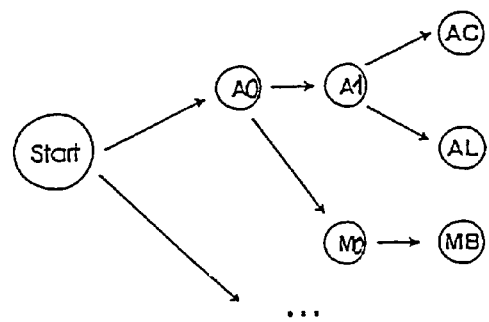
FIG. 4 shows the beginning of the graph of FIG. 3 utilizing the present invention.

Based on the example of FIG. 3, FIG. 4 depicts the procedure according to the present invention. What is selected, for purposes of illustration, is a variant of the present invention in which at the beginning of the word sequence, a segment of constant predefined length is processed using a recognition method with unique syntax integration, and a changeover is then made to a statistical recognition method with word sequence evaluation. The basis for the recognition method with unique syntactic limitation is a syntactic digram recognition method. The length of the introductory segment at the beginning of the word sequence is assumed to be k=3 words. It is assumed for the subsequent segment of the word sequence, whose length is a priori not known or limited, that a statistical recognition method with word sequence evaluation, and with the information depth of a trigram method, will be used. In order to illustrate a particularly preferred embodiment of the present invention, a description will also be given of processing of the trigram information using a digram recognition method, by the fact that the information volume of three words (word triplet) present inside the trigram window is divided into two overlapping pseudowords (word doublet) that each comprise a combination of two successive words of the underlying trigram window.

In the example sketched in FIG. 4, proceeding from the Start node, at the beginning of a word sequence a syntactic digram recognition method is applied in a manner known from the existing art. For the city names entered in FIGS. 2 and 3 as network paths:

AACHEN

AALEN

AMBERG, this means that the first three individually spoken letters

A A C
A A L
A M B are processed with the syntactic digram recognition method. For processing of the subsequent word sequence segment using a trigram recognition method, it is advantageous if the information from the first segment can also already be evaluated as history for the beginning of the second segment. For processing with the information depth of a trigram, this means that the letter sequences

A C H E N
A L E N
M B E R G of the information should advantageously be available with trigram information depth. The processing in the second segment of the word sequence entered in spelled-out fashion therefore advantageously also includes the last two letters of the first segment.

It is particularly advantageous if the same speech recognition system can be used in all successive segments. For this purpose, in the second segment the information present with trigram information depth is now processed using a digram recognition method. This is done by reshaping the word triplet of the trigram window, which is shifted stepwise sliding fashion along the word sequence, into a pseudoword doublet in which each two adjacent words of the word triplet of the trigram window are combined into one pseudoword. For the examples selected, the result is thus a sequence of pseudowords of the following type:

AC CH HE EN
AL LE EN
MB BE ER RG, in which each two successive pseudowords (letter pair) contain the speech information of a word triplet from one trigram window. Reshaping the word triplets into pseudoword doublets makes possible digram processing, which takes into account only two successive pseudowords in each case, while retaining the trigram information depth. Because digram processing is used in the second segment as well, the design of the speech recognition system remains the same over the entire word sequence.

For the transition from the first segment with processing based on a syntactic digram recognition method to the second segment with processing based on the pseudoword digram recognition method without syntactic limitation, it is advantageous if, in the first segment, the last word node has added to it the information of the previous word node; this results, in the first segment, in a sequence of word nodes (letters) of the following kind:

A A AC
A A AL
A M MB;

the last word node once again constitutes a pseudoword with the information of the previous node.

Figure 2:
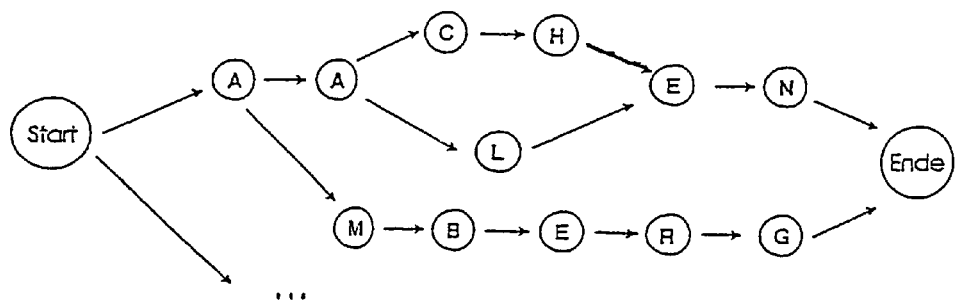
FIG. 2 shows a network graph according to the existing art.
Figure 5:
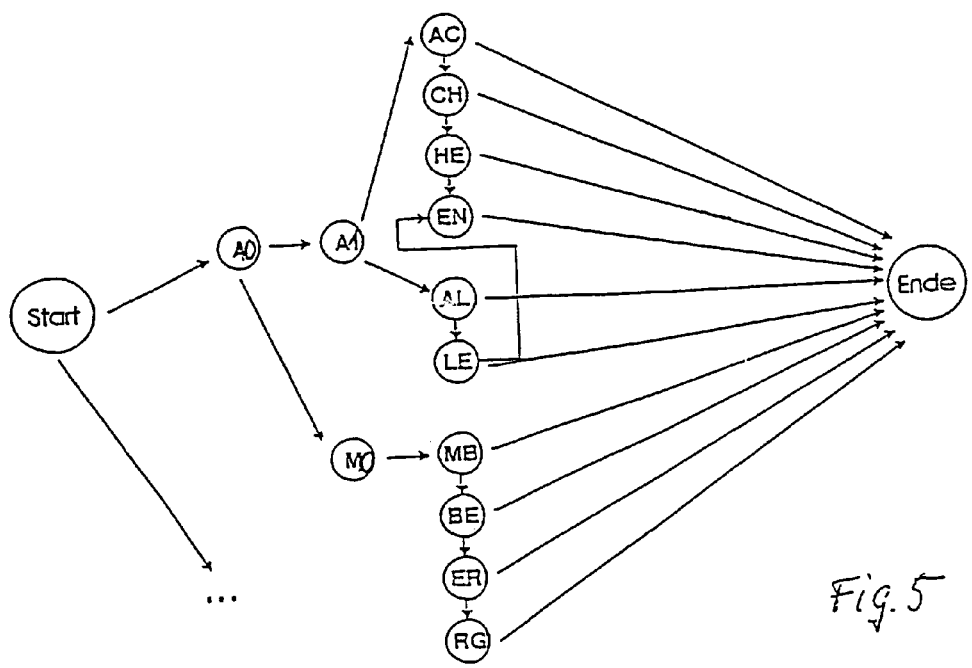
FIG. 5 shows an expanded example based on the principle of FIG. 4.

FIG. 5 depicts a portion, configured using this principle, of the network graph for the examples also selected in FIGS. 2 and 3. Proceeding from a Start node, in the first segment the network is built up with individual word nodes (individual letters) which then, at the transition to the second segment, transition into pseudoword nodes each having the information volume of two successive letters. The transitions between the pseudoword nodes are evaluated, in a manner known per se, on the basis of learning samples. The resulting network graph comprises a combination of the two different recognition methods. Despite the considerably greater number of distinguishable pseudowords as compared to the number of different letters, dispensing with continuous application of a syntactic limitation over the entire network results in a considerable reduction in processing outlay, with a high recognition rate.

In the example of FIG. 5, arrows from each of the pseudoword nodes to the End node indicate that even after only a portion of the entire word sequence, the speech input may already be sufficient for allocation of a term from the predefined list. In a recognition system, this can be implemented by the fact that once the number of terms considered relevant after input of a portion of the word sequence has been sufficiently limited, the recognition system offers a selection of terms (on a display, for example) so that input can thereby be shortened.

The present invention is not limited to the exemplary embodiments described, but rather can be modified in various ways in the context of the capabilities of one skilled in the art. In particular, the degree to which syntactic information is taken into account in the second method is variable.

What is claimed is:

1. A method for recognizing speech from a word sequence, the method comprising:
    applying a first recognition procedure to a first segment of the word sequence, the first segment including a plurality of first words, the first recognition procedure including a digram recognition method with integrated unique syntax;
    applying a second recognition procedure to a second segment of the word sequence, the second segment including a plurality of second words, the second recognition procedure including a statistical word sequence evaluation;
    combining a last two words of the plurality of first words into a pseudoword upon a change from the first recognition procedure to the second recognition procedure; and
    processing the pseudoword using a digram detection method.

2. The method as recited in claim 1 wherein at least one of the first and second segments is predefined in terms of at least one of a respective segment length and segment position.

3. The method as recited in claim 2 wherein at least one of the first and second segments is permanently allocated to one of the first and the second recognition procedure.

4. The method as recited in claim 3 wherein the first segment has a predefined length and is positioned at a beginning of the word sequence.

5. The method as recited in claim 1 wherein the second segment has a predefined length and is positioned at a beginning of the word sequence.

6. The method as recited in claim 1 wherein a change from the second recognition procedure to the first recognition procedure is performed based on a respective word detection or phrase detection.

7. The method as recited in claim 6 wherein the second recognition procedure is used as standard.

8. The method as recited in claim 1 wherein the first and second segments include successive word sequence segments.

9. The method as recited in claim 1 wherein each of the first and second words include a sound sequence that includes at least one of (a) a spoken letter, (b) a syllable and (c) a syllable sequence.

10. A method for recognizing speech from a word sequence, the method comprising:
- applying a first recognition procedure that includes an integrated unique syntax procedure to a first segment of the word sequence, the first segment including a plurality of first words;
- applying a second recognition procedure that includes a statistical word sequence procedure to a second segment of the word sequence, the second segment including a plurality of second words;
- combining a last two words of the plurality of first words into a pseudoword upon a change from the first recognition procedure to the second recognition procedure; and
- processing the pseudoword using a digram detection method;
- wherein the first recognition procedure is a digram recognition procedure and the second recognition procedure is a trigram recognition procedure and wherein the second recognition procedure limits permissible series of second words in the second segment according to a statistical evaluation.

11. The method as recited in claim 10 wherein the applying the second recognition procedure includes:
- recognizing a word triplet, the word triplet including three second words of the plurality of the second words; and
- representing the word triplet as a pseudoword doublet, the pseudoword doublet including a second and a third pseudoword, the second pseudoword overlapping with the third pseudoword and each of the second and third pseudowords including two of the three second words of the word triplet.

* * * * *